United States Patent
Ougier et al.

(10) Patent No.: US 12,005,624 B2
(45) Date of Patent: Jun. 11, 2024

(54) COEXTRUSION MACHINE FOR ELASTOMERIC COMPOUNDS, AND METHOD FOR MANUFACTURING A PROFILED ELEMENT STRIP

(71) Applicant: Compagnie Generale Des Etablissements Michelin, Clermont-Ferrand (FR)

(72) Inventors: Christophe Ougier, Clermont-Ferrand (FR); Henri Hinc, Clermont-Ferrand (FR); Nicolas Jaunet, Clermont-Ferrand (FR); Arnaud Letocart, Clermont-Ferrand (FR)

(73) Assignee: COMPAGNIE GENERATE DES ETABLISSEMENTS MICHELIN, Clermont-Ferrand (FR)

( * ) Notice: Subject to any disclaimer, the term of this patent is extended or adjusted under 35 U.S.C. 154(b) by 387 days.

(21) Appl. No.: 17/276,944

(22) PCT Filed: Sep. 17, 2019

(86) PCT No.: PCT/FR2019/052164
§ 371 (c)(1),
(2) Date: Mar. 17, 2021

(87) PCT Pub. No.: WO2020/058625
PCT Pub. Date: Mar. 26, 2020

(65) Prior Publication Data
US 2022/0032525 A1   Feb. 3, 2022

(30) Foreign Application Priority Data
Sep. 20, 2018 (FR) ...................... 1858522

(51) Int. Cl.
*B29C 48/35* (2019.01)
*B29C 48/08* (2019.01)
(Continued)

(52) U.S. Cl.
CPC .............. *B29C 48/35* (2019.02); *B29C 48/08* (2019.02); *B29C 48/21* (2019.02); *B29C 48/307* (2019.02);
(Continued)

(58) Field of Classification Search
CPC ....... B29C 48/08; B29C 48/21; B29C 48/307; B29C 48/35; B29C 48/355; B29C 48/49;
(Continued)

(56) References Cited

U.S. PATENT DOCUMENTS 2,327,627 A * 8/1943 Esselen .................. B29C 48/08
52/309.1
3,240,853 A * 3/1966 Shichman ............. B29C 48/914
264/327
(Continued)

FOREIGN PATENT DOCUMENTS

DE   4211669 C1   8/1993
EP   0139604 A2   5/1985
(Continued)

*Primary Examiner* — Xiao S Zhao
*Assistant Examiner* — Joseph S Leyson
(74) *Attorney, Agent, or Firm* — Dickinson Wright PLLC; Steven C. Hurles

(57) ABSTRACT

The machine includes an extrusion head having flow ducts, the inlet orifices of which are connected to the outlets of at least two extruders for supplying extruded strips made of elastomeric compounds. The outlet orifices lead into a die which is adjacent to a roller and is designed to cooperate with the latter to shape the profiled element strip. The roller has a central axis surrounded by an external surface intended to receive the profiled element strip and a means for driving the roller in rotation about its central axis. The flow ducts are mutually parallel and are perpendicular to the circumferential direction of the roller, and the profiled element strip is (Continued)

joined to the receiving surface of the roller along an equivalent length of at least 700 mm.

9 Claims, 3 Drawing Sheets

(51) Int. Cl.
| | |
|---|---|
| *B29C 48/21* | (2019.01) |
| *B29C 48/305* | (2019.01) |
| *B29C 48/345* | (2019.01) |
| *B29C 48/355* | (2019.01) |
| *B29C 48/49* | (2019.01) |
| *B29C 48/87* | (2019.01) |
| *B29C 48/88* | (2019.01) |
| *B29C 48/885* | (2019.01) |
| *B29D 30/06* | (2006.01) |
| *B29K 7/00* | (2006.01) |
| *B29L 9/00* | (2006.01) |
| *B29L 30/00* | (2006.01) |

(52) U.S. Cl.
CPC .......... *B29C 48/345* (2019.02); *B29C 48/355* (2019.02); *B29C 48/49* (2019.02); *B29C 48/87* (2019.02); *B29C 48/885* (2019.02); *B29C 48/914* (2019.02); *B29D 30/06* (2013.01); *B29K 2007/00* (2013.01); *B29L 2009/00* (2013.01); *B29L 2030/00* (2013.01)

(58) Field of Classification Search
CPC ....... B29C 48/87; B29C 48/914; B29D 30/06; B29L 2030/00
See application file for complete search history.

(56) References Cited

U.S. PATENT DOCUMENTS

| | | | | |
|---|---|---|---|---|
| 3,584,600 | A * | 6/1971 | Ishiwata | B05C 5/0254 |
| | | | | 118/119 |
| 4,421,709 | A * | 12/1983 | Steinberg | B29C 48/08 |
| | | | | 425/223 |
| 5,256,357 | A * | 10/1993 | Hayward | B29C 48/08 |
| | | | | 264/172.19 |
| 5,928,679 | A * | 7/1999 | Ohki | B29C 48/49 |
| | | | | 425/374 |
| 5,945,131 | A * | 8/1999 | Harvey | A44B 18/0061 |
| | | | | 425/149 |
| 6,695,606 | B1 | 2/2004 | Burg et al. | |
| 6,824,828 | B2 * | 11/2004 | Su | G03C 1/74 |
| | | | | 427/407.1 |
| 8,728,580 | B2 * | 5/2014 | Kuniyasu | B05C 9/06 |
| | | | | 427/372.2 |

FOREIGN PATENT DOCUMENTS

| | | |
|---|---|---|
| GB | 772148 A | 4/1957 |
| JP | H03295627 A | 12/1991 |
| JP | 2004216725 A | 5/2004 |
| WO | 2018115797 A1 | 6/2018 |

* cited by examiner ated strips made of elastomeric compounds into a single coextruded product in a single coextrusion machine. Several extruders are arranged together around a common extrusion head comprising product flow ducts in the direction of an outlet die. In the coextrusion machines of the prior art, the extruders used are arranged as "bellows", or in other words such that the rotational axes of their extrusion screws converge towards the extrusion head. Such a convergent arrangement induces high stresses in the compound strips passing through the transfer ducts of the extrusion head. Because of the visco-elastic nature of the elastomers, significant shrinkage

COEXTRUSION MACHINE FOR ELASTOMERIC COMPOUNDS, AND METHOD FOR MANUFACTURING A PROFILED ELEMENT STRIP

CROSS-REFERENCE TO RELATED APPLICATION

This application claims priority to and the benefit of PCT Patent Application No. PCT/FR2019/052164 filed on 17 Sep. 2019, entitled "COEXTRUSION MACHINE FOR ELASTOMERIC COMPOUNDS, AND METHOD FOR MANUFACTURING A PROFILED ELEMENT STRIP," and French Patent Application No. 1858522, filed on Sep. 20, 2018, entitled "COEXTRUSION MACHINE FOR ELASTOMERIC COMPOUNDS, AND METHOD FOR MANUFACTURING A PROFILED ELEMENT STRIP".

BACKGROUND

1. Field

The disclosure relates to the field of the production of strips of coextruded visco-elastic products such as elastomeric products intended for the manufacture of tires. More particularly, it relates to the manufacture of coextruded complex profiled elements based on elastomeric compounds and intended for the manufacture of a tire tread or side wall.

2. Related Art

In the known fashion, in the manufacture of complex profiles by extrusion of at least two products in strip form, based on elastomeric compounds combined for example by coextrusion, several extruders are connected to a common extrusion head. Each extruder is formed of a cylindrical body or barrel which is stationary, and inside which there is a screw that is coaxial with the longitudinal axis of the barrel and driven in rotation about this axis. Its purpose is to homogenize a rubber mix introduced into it in the form of a strip and to drive it towards an outlet die. For a complex product, the outlet die receives several elastomeric compounds of identical or different compositions and determines the profile of the coextruded profiled element strip. This profile is defined by a fixed profiled blade which collaborates with a rotary roller or with a fixed wall.

Nowadays, there is an increasing demand for the use of complex products of the type of complex profiled element strip, made from different individual profiles that are extruded or superposed in order to reduce the number of successive laying operations of products during assembly, so as to reduce costs and to improve the quality of the end product. It is preferable to obtain these complex products by coextrusion, because that method provides better mutual cohesion between the various components.

Coextrusion allows the combination of several extruded strips of elastomeric compounds into a single coextruded product in a single coextrusion machine. Several extruders are arranged together around a common extrusion head comprising product flow ducts in the direction of an outlet die. In the coextrusion machines of the prior art, the extruders used are arranged as "bellows", or in other words such that the rotational axes of their extrusion screws converge towards the extrusion head. Such a convergent arrangement induces high stresses in the compound strips passing through the transfer ducts of the extrusion head. Because of the visco-elastic nature of the elastomers, significant shrinkage (in the longitudinal direction of the strip) and swelling (in the transverse direction of the strip) phenomena occur after this convergence zone of the transfer ducts. A coextruded profiled element strip may therefore deform after leaving the die in two transverse directions, and may become simultaneously thicker and narrower or vice versa.

To rectify this problem, document U.S. Pat. No. 6,695,606 proposes a solution which consists of using a rotating roller close to the outlet die of the extrusion head. The rotating roller participates in the flow of the complex product obtained after the outlet from the die, by reducing the internal stresses which are partially relaxed while the complex product remains attached to the roller. These stresses are mainly elongation stresses which result from the reduction in cross-section of the ducts of the extrusion head. According to this document, the flow ducts are dimensioned such that the cross-section of the ducts may transform progressively with the flow of the material. However, apart from complexity of the shape of the cross-section and the dimensioning of these ducts, because of the convergence of the ducts in the extrusion head, the problem of residual stresses in the coextruded complex product remains.

Document WO2018115797 in the name of the applicant describes a coextrusion machine comprising several extruders arranged on either side of an extrusion head. The extrusion head comprises mutually parallel transfer ducts leading to an outlet die. Thus the solution proposed in this document may remedy the problem of elongation stresses induced by the "bellows" arrangement of the machine extruders. However, it has been found that swelling stresses were still present in the product obtained at the outlet from the die.

For the production of tires, with the aim of optimizing their performance, it is necessary to use coextruded products with a very precise geometry.

SUMMARY OF THE INVENTION AND ADVANTAGES

The object of the disclosure is to overcome said drawbacks.

The disclosure proposes a machine for manufacturing, by coextrusion, a profiled element strip based on a plurality of extruded strips made of elastomeric compounds, comprising an extrusion head having flow ducts, the inlet orifices of which are connected to the outlets of at least two extruders for supplying extruded strips made of elastomeric compounds, and the outlet orifices of which lead into a die which is adjacent to a roller and is designed to cooperate with the latter to shape the profiled element strip, the roller having a central axis surrounded by an external surface intended to receive the profiled element strip and means for driving the roller in rotation about its central axis, characterized in that the flow ducts are mutually parallel and are perpendicular to the circumferential direction of the roller, and the profiled element strip is joined to the receiving surface of the roller along an equivalent length of at least 700 mm.

A "radial" direction is a direction which follows the radius direction of the roller. An "axial" direction is a direction which is parallel to the axis of rotation of the roller. A "circumferential" direction is a direction which is perpendicular both to a radius of the roller and to the axial direction.

According to the disclosure, the various strips of elastomeric compounds are extruded by means of an extrusion head common to the mutually parallel flow ducts, using a roller die, also known as a "roller tip". The die is adjacent to the roller and designed so as to cooperate therewith for shaping the profiled element strip. It is understood that the die is arranged contiguous to the external surface of the roller, and that the surface of the die facing the roller comprises a cylindrical surface which closely follows the contour of the roller surface. To this end, the cylindrical surface of the die comprises shaping orifices which communicate with the flow ducts of the extrusion head, and the function of which is to shape the different strips coming from the different ducts and guide them during their application onto the roller, so as to form a single coextruded profiled element strip with the cylindrical surface of the roller.

More particularly, the flow ducts which supply the mixtures to the outlet die and hence to the roller are parallel and perpendicular to the circumferential direction of the roller. These ducts are not arranged converging in the direction of the roller, as in the documents of the prior art, and therefore the stresses applied to the compound are lower, said stresses being due mainly to passage through the orifices of the outlet die. Such an extrusion by means of a roller tip allows blocking of the two dimensions (length and width) of the coextruded profiled element strip, the sole of which adheres to the receiving surface of the roller tip. Because of the principle of volume conservation, the third dimension, the thickness of the strip, remains constant. In order to relax the residual stresses better, the coextruded profiled element strip must remain on the roller over a predetermined length. During laboratory testing with tire treads and side walls, a length of at least 700 mm was judged sufficient to relax the stresses. As a result, a coextruded profiled element strip with a very precise geometry is obtained.

The equivalent length means the contact distance between the coextruded profiled element strip leaving the die and the receiving surface of the roller. The receiving surface of the roller means the part of the roller in contact with the coextruded profiled element strip, this part being the external surface of the roller when it comes into direct contact with the profiled element strip, or the external surface of a belt driven by the roller and interposed between the external surface of the roller and the coextruded profiled element strip.

In a first embodiment of the disclosure, said roller is cylindrical with a diameter greater than or equal to 0.6 m.

Preferably, the machine comprises a first cooling system for the external surface of the roller, and a second cooling system for the support bearings of the roller, that are connected to a control unit which controls the operation of the two cooling systems according to a same setpoint temperature.

In a second embodiment, the profiled element strip is joined to the receiving surface along a distance equal to at least ½ and preferably ¾ of the circumference of the roller before being transferred to a transport device.

In a variant embodiment of the disclosure, the roller is arranged above the extrusion head.

In a variant embodiment of the disclosure, the roller is arranged below the extrusion head.

Preferably, the machine comprises a deflecting roller interposed between the roller and a transport device for the profiled element strip.

In a third embodiment, the roller drives an endless belt interposed between the die and said roller, such that the die cooperates with the roller for shaping the profiled element strip by means of said belt.

Preferably, said belt is made of metal, and preferably stainless steel.

The object of the disclosure is also achieved with a method for manufacturing, by coextrusion, a profiled element strip based on a plurality of elastomeric compounds, using a machine comprising a plurality of extruders, an extrusion head and a laying roller according to the disclosure, characterized in that:
 a profiled element strip is coextruded using an extrusion head in which the flow ducts are mutually parallel and are perpendicular to the circumferential direction of the laying roller, and the profiled element strip is joined to the receiving surface of the roller along an equivalent length of at least 700 mm;
 then the resulting profiled element strip is transferred by means of a transfer device.

BRIEF DESCRIPTION OF THE DRAWINGS

The disclosure will be understood better from the rest of the description, which is supported by the following figures.

DETAILED DESCRIPTION OF THE ENABLING EMBODIMENTS

Figure 1:
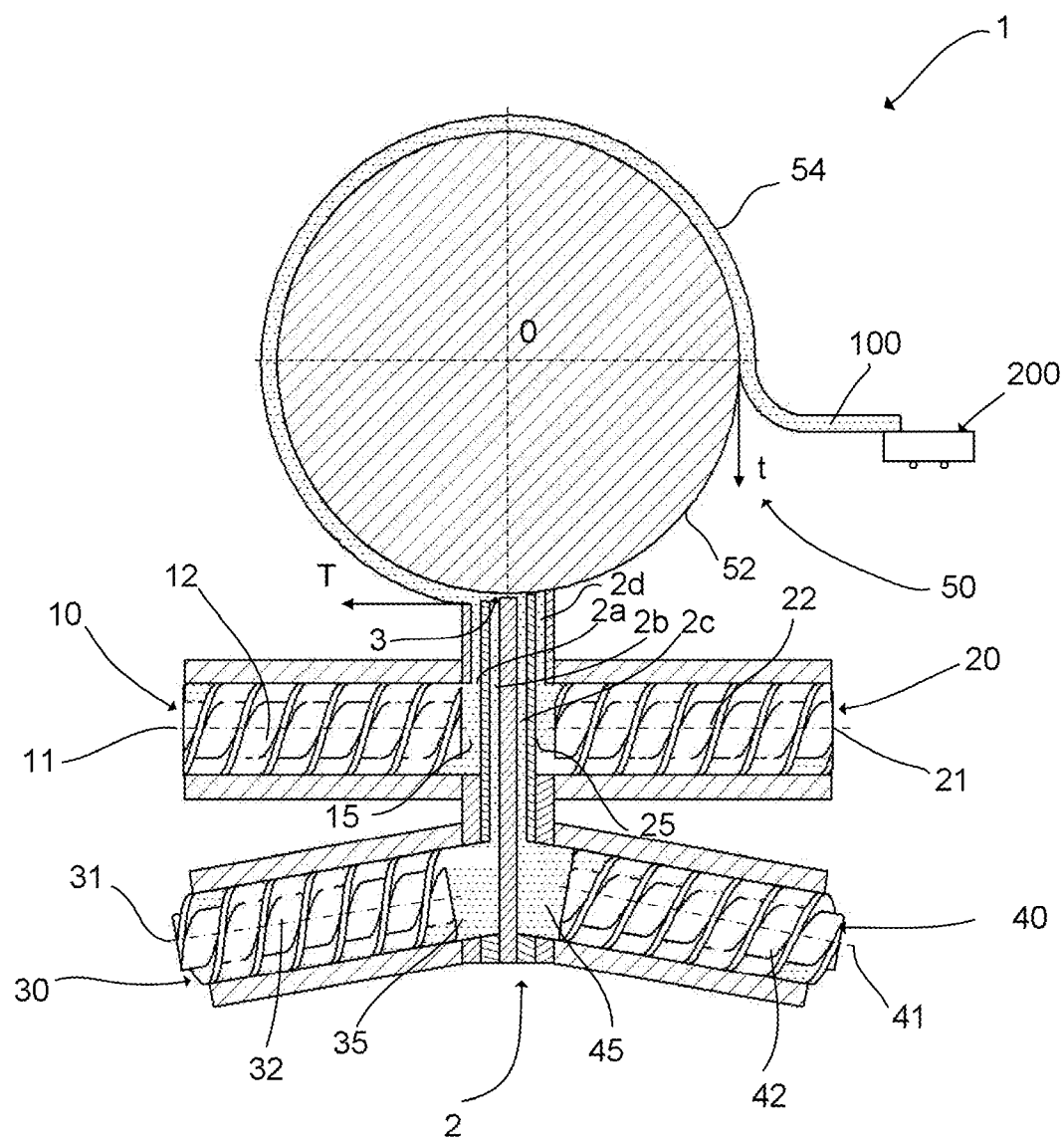
FIG. 1 is a schematic cross-sectional view of the machine of the disclosure according to a first and a second embodiment.

In the various figures, elements that are identical or similar bear the same reference. Their description is therefore not systematically repeated.

The figures illustrate a coextrusion machine 1 used to extrude visco-elastic materials of the elastomeric compound type in order to form a complex profiled element strip 100, for example a tire tread or side wall. The coextrusion machine 1 comprises an extrusion head 2 connected to several extruders 10, 20, 30 and 40, each of which provides it with a pressurized elastomeric compound. The pressurized elastomeric compounds follow flow ducts which pass through the extrusion head up to an outlet die 3.

The extruders 10, 20, 30, 40 have been illustrated schematically, depicting only their respective screws, but it will be appreciated that, in a way that is generally known, the screw of each extruder rotates inside a cylindrical barrel equipped with an inlet for supplying an elastomeric compound, in the form of a compound strip, and with an outlet which opens into the extrusion head 2 when the latter is in place. The screw 12, 22, 32, 42 of each extruder 10, 20, 30, 40 is driven in rotation about its longitudinal axis 11, 21, 31, 41 by a motor, situated at the opposite end of the screw to the end that reaches the extrusion head, so that it rotates inside its respective barrel in order to supply the extrusion head 2 with an elastomeric compound that has been homogenized and is ready to be shaped by that head.

The extruders 10, 20, 30, 40 are arranged on either side of the extrusion head 2 and in such a way that the outlet of each extruder communicates directly with an inlet duct conveying compound into the extrusion head 2. In other words, the extrusion head 2 is connected directly to the extruders 10, 20, 30, 40 without there being any elastomer-compound transfer duct between the two. The extrusion head 2 groups all of the dimensional tooling (transfer ducts connecting it to the outlets of the extruders and extrusion die) specific to a given profiled element together into a single one-piece assembly that is mounted such that it can be removed. In the event of a change in profiled element product, such a one-piece assembly is rapidly taken away and replaced by another suited to the new product.

The compounds arrive at the inlet orifices 15, 25, 35, 45 in the extrusion head 2, which also comprises flow ducts 2a, 2b, 2c, 2d ensuring the transfer of the compounds from the different extruders to an outlet die 3. The flow ducts 2a, 2b, 2c and 2d extend in a direction substantially perpendicular to that of the longitudinal axes of the extruders 10, 20, 30, 40. Substantially perpendicular means at an angle of 90°+/−20°.

In a variant of the disclosure, the extruders 10, 20, 30, 40 are arranged with their longitudinal axes 11, 21, 31, 41 mutually parallel and perpendicular to the planes of the opposite faces of the extrusion head, which form interface planes.

The coextrusion machine 1 also comprises a roller 50 which cooperates in operation with the die 3. The roller 50 has a cylindrical external surface 52 and is mounted so as to rotate around a rotation axis passing through the center of symmetry O of its cross-section. An electric motor (not shown on the drawings) is provided to drive this in rotation at a predefined speed via a motor-gear unit and using control means. The rotation speed of the roller is generally between 4 and 25 m/minute and is determined by the productivity of the machine. In operation, the roller 50 cooperates with the outlet die 3, and in turning carries the coextruded profiled element strip 100 to a transfer device such as a conveyor belt 200.

The roller 50 is rigid, and is preferably made of steel with a polished external surface 52 having a roughness Ra<0.4.

According to the disclosure, the flow ducts 2a, 2b, 2c, 2d are mutually parallel and are perpendicular to the circumferential direction of the roller 50, and the profiled element strip coextruded with the machine according to the disclosure is joined to the receiving surface along an equivalent length of at least 700 mm.

The equivalent length means the contact distance between the coextruded profiled element strip leaving the die 3 and the external receiving surface 52 of the roller. The coextruded profiled element strip 100 remains in contact with the roller over a distance 54 of equivalent length greater than or equal to 700 mm, which allows relaxation of all outlet stresses when transferred by a conveyor belt 200 in the direction of an assembly or storage station.

The flow ducts 2a, 2b, 2c and 2d are mutually parallel and are perpendicular to the circumferential direction of the roller 50, being arranged in vertical planes parallel to the rotational axis of the roller. Preferably, the median vertical plane parallel to the flow ducts of the extrusion head 2 contains the rotational axis of the roller 50.

Figure 2:
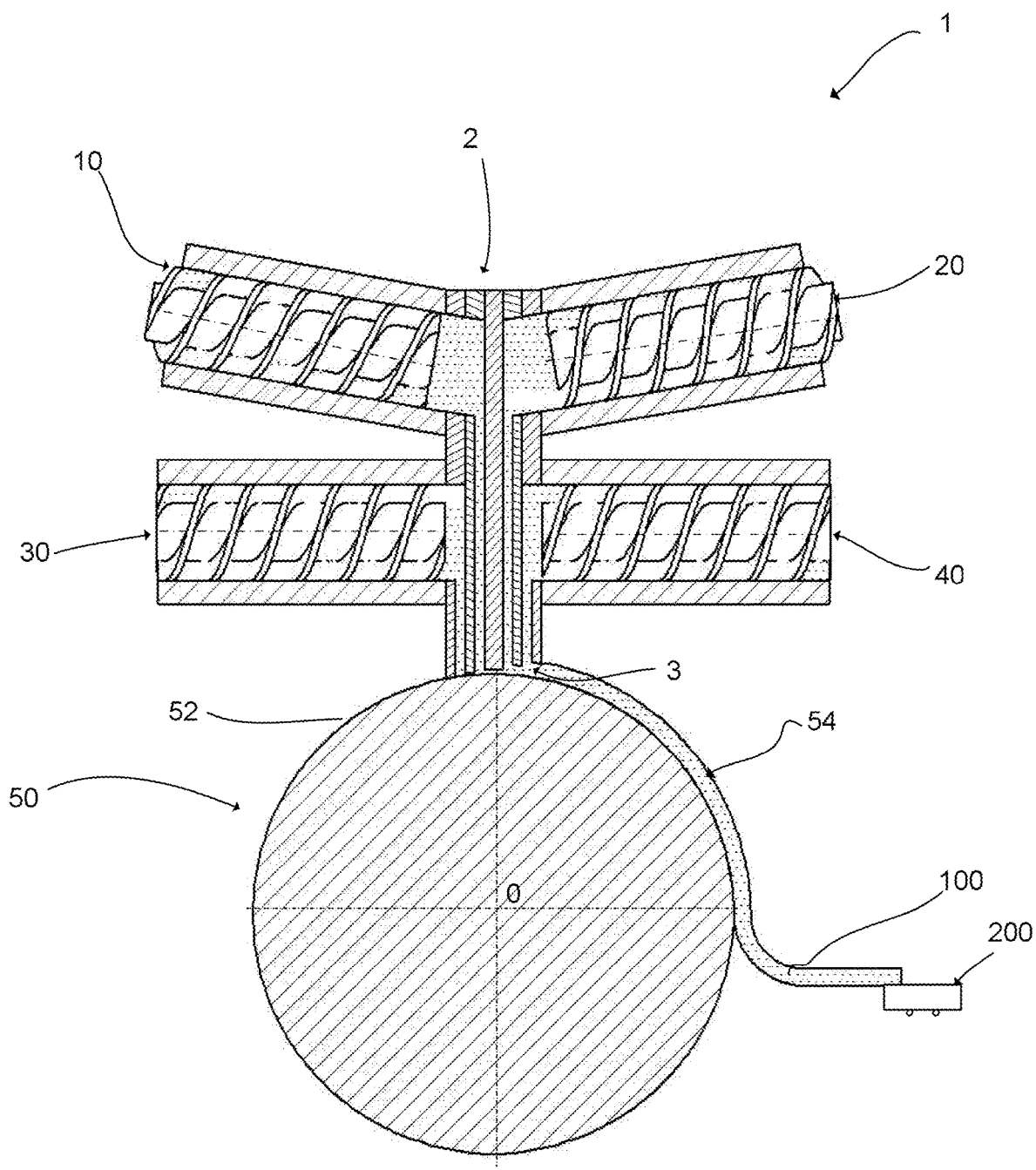
FIG. 2 is a schematic cross-sectional view of the machine according to a first embodiment.

In a first embodiment of the disclosure, as best shown on FIG. 2, the diameter of the roller 50 or the external diameter is equal to or greater than 0.6 m and preferably between 0.6 m and 4 m, and even more preferably between 1 and 2.5 m. During laboratory tests, it was found that a roller with a large diameter compared with rollers of extrusion machines of the prior art, which are generally between 200 and 500 mm, allows the coextruded profiled element strip to remain on the roller for longer while avoiding impressing thereon an excessively large radius of curvature.

Such a rigid roller with large diameter requires a robust structure of the support and rotational bearings, and good precision in the positioning of the roller. Preferably, the roller comprises a first cooling system for its external surface 52, for example in the form of a temperature-controlled water circuit, which allows cooling of the profiled element strip 100, and a second cooling system for its support bearings (not illustrated on the drawings). It is advantageous that the cooling system for the external surface 52 and that for the roller support bearings are cooled to the same temperature, so as to avoid phenomena of differential expansion between the two and to obtain dimensional stability of the assembly in operation. The cooling circuit is connected to a control unit which controls the cooling system according to a same setpoint temperature.

Figure 3:
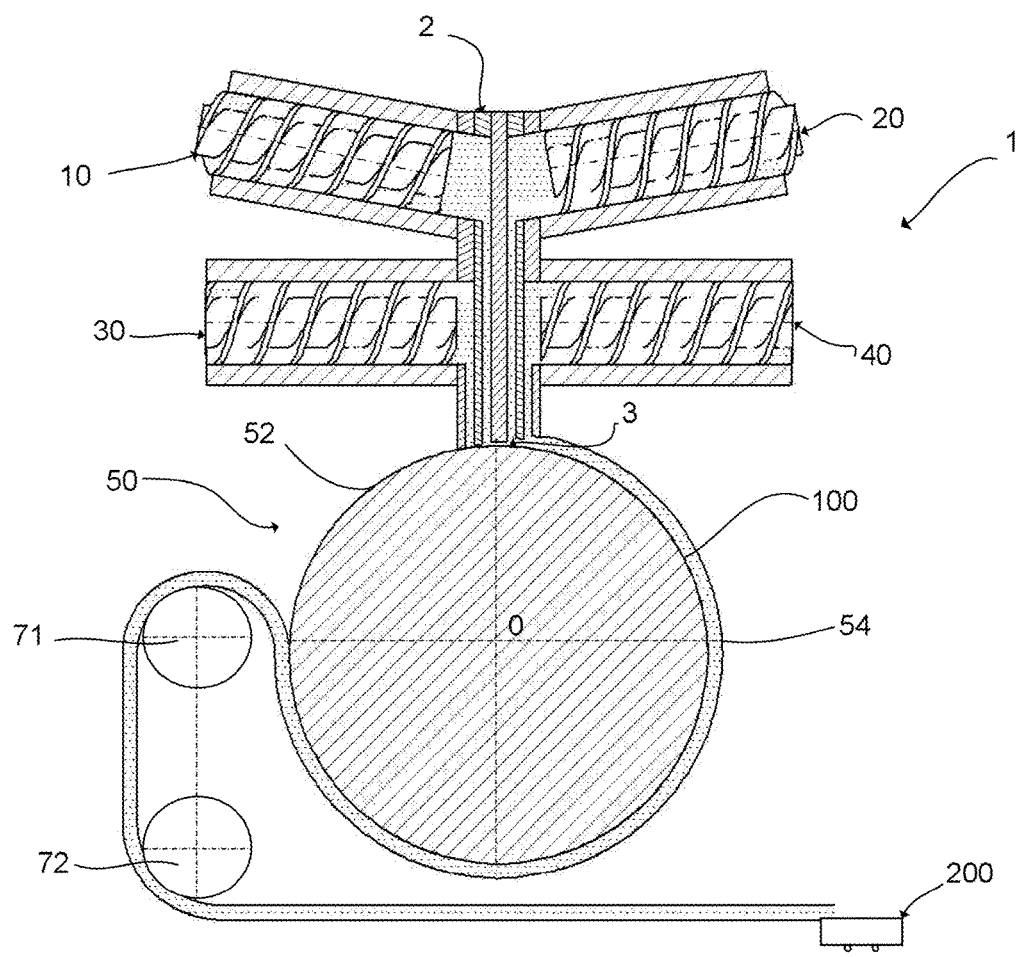
FIG. 3 is a schematic cross-sectional view of the machine according to a variant of the second embodiment.

In a second operating mode, as best shown on FIGS. 1 and 3, the profiled element strip 100 is joined to the external surface 52 of the roller 50 along a distance equal to at least ½ and preferably ¾ of the circumference of the roller 50 before being transferred to a strip transport device.

Thus advantageously, the coextruded profiled element strip remains held over at least 180° or preferably 270° of the circumference of the roller. The holding over ¾ of a turn of the roller is a decisive factor for products with no adhesion to the external surface of the roller. In order to obtain adhesion to the roller and hence relaxation of the stresses with controlled geometry, the tension to be applied to the product at the roller outlet must be low in order to avoid deformation of the product.

Holding over ¾ of a turn of the roller allows such a low outlet tension to be achieved for the product. Thus the calculations performed with the formula $T/t = \exp(f \cdot \text{alpha})$, where T is the traction produced at the outlet of the roller tip (which gives the shrinkage stresses),
t is the tension at the outlet of the roller which should be as low as possible in order not to deform the strip,
f is the coefficient of friction, and
alpha is the angle through which the product is held on the roller (the holding angle equates to 90° or Pi/2 rad for one quarter of a turn, or 180° or Pi rad for half a turn, and 270° or 1.5 Pi rad for three-quarters of a turn),
reflect this result (where the cells of the table below give the ratio T/t):

|  | f = 0.5 | f = 1 |
|---|---|---|
| 1/4 turn | 2 | 5 |
| 1/2 turn | 5 | 23 |
| 3/4 turn | 11 | 111 |

Thus with such holding over ¾ of the circumference of the roller 50, the profiled element strip 100 is driven mainly by friction with the surface of the roller and not by the outlet tension.

In the variant of FIG. 1, the roller 50 is arranged above the assembly formed by the extruders 10, 20, 30, 40 and the extrusion head 2, which will be referred to below as "tooling". This again allows discharge of the coextruded profiled element strip 100 with the "sole" (flat part) oriented in the direction of the belt surface of the conveyor belt 200.

In the variant of FIG. 3, for reasons of accessibility and ergonomics, the roller 50 is arranged above the tooling. This requires the angles to be reversed in order to return the coextruded profiled element strip 100 to the optimum direction for transport on the discharge belt. Deflecting rollers 71 and 72 are provided to this end between the roller 50 and the conveyor belt 200.

When using a roller of diameter equal to or greater than 1 m in the second embodiment, it was found that holding the coextruded product over an angular distance of between 180° and 210° of the external surface 52 of the roller gives very good results in terms of stress relaxation.

Figure 4:
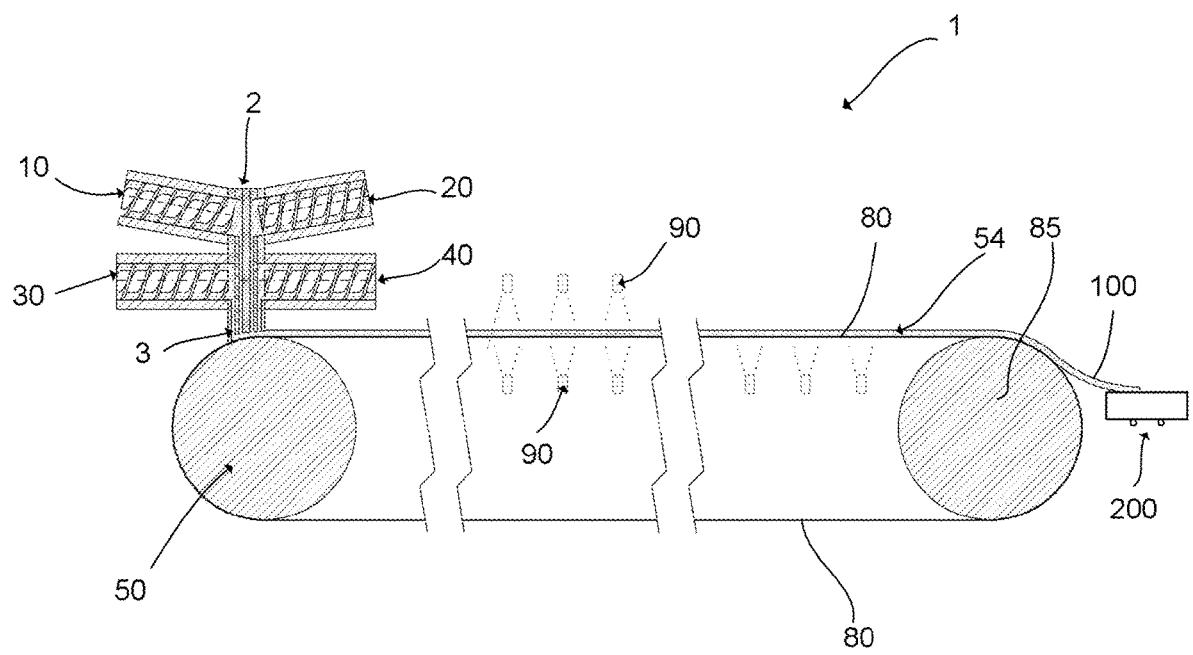
FIG. 4 is a schematic cross-sectional view of the machine according to a third embodiment.

In a third embodiment and as shown more clearly in FIG. 4, the roller 50 drives an endless belt 80 interposed between the die 3 and said roller, such that the die 3 cooperates with the roller 50 for shaping the profiled element strip by means of said belt.

In order to solve problems of construction of a roller 50 of large diameter, it is advantageous to install a belt which allows the coextruded profiled element strip to remain in position for much longer, and thus maximize the stress relaxation. Such a belt 80 is installed between two rollers, a first drive roller formed by the roller 50 of the roller tip, and a second roller 85 mounted so as to rotate freely. In a variant embodiment, the rollers 50 and 85 have a diameter of around 300 mm.

In order to guarantee an optimal service life of the belt 80, it is preferably made of stainless steel.

Controlling the belt speed is essential for obtaining the desired geometry of the coextruded profiled element strip 100. To avoid slippage between the metallic belt 80 and the roller 50, it is advantageous to arrange zones coated with an adhesive material (rubber for example) on the external surface of the roller.

A cooling device 90 for the belt 80 may be provided. This cooling device 90 may, in the known fashion, comprise atomization nozzles for a cooling fluid, situated above and/or below the belt 80.

The coextruded profiled element strip 100 leaves the belt 80 at the level of the second roller 85 and is discharged by a conveyor belt 200 in the direction of another station of the tire manufacturing facility.

In the attached drawings illustrating the machine of the disclosure, all the extruders 10, 20, 30, 40 of the installation 1 are extruders employing an Archimedean screw. In another variant of the disclosure, at least one of the extruders of the installation 1 is a positive-displacement extruder, for example of the positive-displacement, contra-rotating, twin-screw extruder type with closely intermeshing screw flights with mating profiles, of the type described in patent application WO2017/109419 in the name of the applicant. Moreover, it is possible to use other types of positive-displacement extruders, for example of the geared pump or piston pump type.

Other variants and embodiments of the disclosure can be envisaged without departing from the scope of its claims. Thus a combination of embodiments may be considered, for example a roller 50 of the first embodiment may be used in the second and third embodiments.

The invention claimed is:

1. A machine for manufacturing, by coextrusion, a profiled element strip based on a plurality of extruded strips made of elastomeric compounds, comprising an extrusion head having flow ducts, inlet orifices of which are connected to outlets of at least two extruders for supplying extruded strips made of elastomeric compounds, and outlet orifices of which lead into a die which is adjacent to a roller and is designed to cooperate with the roller to shape the profiled element strip, the roller having a central axis surrounded by an external surface intended to receive the profiled element strip and a driver for driving the roller in rotation about its central axis, wherein the flow ducts are mutually parallel and are perpendicular to the circumferential direction of the roller, and the profiled element strip is joined to the external surface of the roller along an equivalent length of at least 700 mm, wherein the machine includes a first cooling surface for the external surface of the roller and a second cooling system for support bearings of the roller, the first and second cooling systems being connected to a control unit which controls the operation of the first and second cooling systems according to a same setpoint temperature.

2. The machine according to claim 1, wherein the external surface of said roller is cylindrical with a diameter greater than or equal to 0.6 m.

3. The machine according to claim 1, wherein the profiled element strip is joined to the external surface of the roller along a distance equal to at least ½ of a circumference of the roller before being transferred to a transport device.

4. The machine according to claim 1, wherein the roller is arranged above the extrusion head.

5. The machine according to claim 1, wherein the roller is arranged below the extrusion head.

6. The machine according to claim 5, wherein the machine comprises a deflecting roller interposed between the roller and a transport device for the profiled element strip.

7. The machine according to claim 1, wherein the roller drives an endless belt interposed between the die and said roller, such that the die cooperates with the roller for shaping the profiled element strip by said belt with the profiled element strip contacting said belt.

8. The machine according to claim 7, wherein said belt is made of metal.

9. A method for manufacturing, by coextrusion, a profiled element strip based on a plurality of elastomeric compounds, using the machine according to claim 1, wherein:

a profiled element strip is coextruded using the extrusion head in which the flow ducts of the extrusion head are mutually parallel and are perpendicular to the circumferential direction of the roller, and the profiled element strip is joined to the external surface of the roller along an equivalent length of at least 700 mm;

then the resulting profiled element strip is transferred by a transfer device.

* * * * *

UNITED STATES PATENT AND TRADEMARK OFFICE
CERTIFICATE OF CORRECTION

| | |
|---|---|
| PATENT NO. | : 12,005,624 B2 |
| APPLICATION NO. | : 17/276944 |
| DATED | : June 11, 2024 |
| INVENTOR(S) | : Christophe Ougier et al. |

It is certified that error appears in the above-identified patent and that said Letters Patent is hereby corrected as shown below:

On the Title Page

Item (73) The Assignee name: COMPAGNIE GENERATE DES ETABLISSEMENTS MICHELIN
Should read: COMPAGNIE GENERALE DES ETABLISSEMENTS MICHELIN Signed and Sealed this
Fifteenth Day of October, 2024

Katherine Kelly Vidal
*Director of the United States Patent and Trademark Office*